United States Patent [19]

Hirs

[11] 4,197,208
[45] Apr. 8, 1980

[54] SYNTHETIC GRANULAR FILTER MATERIAL

[76] Inventor: Gene Hirs, 8228 Goldie, Walled Lake, Mich. 48088

[21] Appl. No.: 23,469

[22] Filed: Mar. 23, 1979

Related U.S. Application Data

[63] Continuation-in-part of Ser. No. 879,281, Feb. 21, 1978, abandoned.

[51] Int. Cl.² .............................................. B01D 39/00
[52] U.S. Cl. ................................................... 210/506
[58] Field of Search ........................ 210/80, 82, 83, 84, 210/73, 284, 290, 275, 277, 278, 500 R, 503, 504, 506, 192, 510, DIG. 26; 428/325, 402, 446

[56] References Cited

U.S. PATENT DOCUMENTS

| | | | |
|---|---|---|---|
| 2,145,901 | 2/1939 | Shoemaker | 210/504 |
| 2,303,629 | 12/1942 | Gelinas | 210/504 |
| 2,585,366 | 2/1952 | Bollaert | 210/500 R |
| 3,104,196 | 9/1963 | Shannon | 428/407 |
| 3,233,741 | 2/1966 | Bell | 210/500 R |
| 3,247,294 | 4/1966 | Sabouni | 428/310 |
| 3,396,123 | 8/1968 | Urban | 210/504 |
| 3,424,674 | 1/1969 | Webber | 210/80 |
| 3,704,786 | 12/1972 | Lerner | 210/504 |
| 3,728,208 | 4/1973 | Whittington | 210/DIG. 26 |
| 3,814,247 | 6/1974 | Hirs | 210/290 |
| 3,862,963 | 1/1975 | Hoshi et al. | 210/503 |
| 4,010,232 | 3/1977 | Labrecque | 428/310 |
| 4,025,689 | 5/1977 | Kobayashi | 210/DIG. 26 |

*Primary Examiner*—Ernest G. Therkorn
*Attorney, Agent, or Firm*—Irons and Sears

[57] ABSTRACT

Synthetic, granular filter particles which are of substantially uniform size, of controlled density, and water-wettable. A method is provided for manufacturing such particles in uniform sizes ranging from about 1/16 to about ⅜ inch and at controlled densities ranging from a specific gravity of about 1.04 to about 1.5. The particles comprise hollow silica beads dispersed in a matrix of cured cement. In deep bed, multi-layer liquid filters, the particles can be utilized as the upper strata of the filter and act as a barrier for particles that would normally plug a deep bed filter having conventional, natural materials, such as sand in the lower strata. Alternatively, all of the strata of the deep bed filter may be comprised of the particles of the present invention in substantially uniform, controlled sizes and densities, the size of the particles decreasing and the density of the particles increasing in the direction of flow through the filter bed.

5 Claims, 1 Drawing Figure

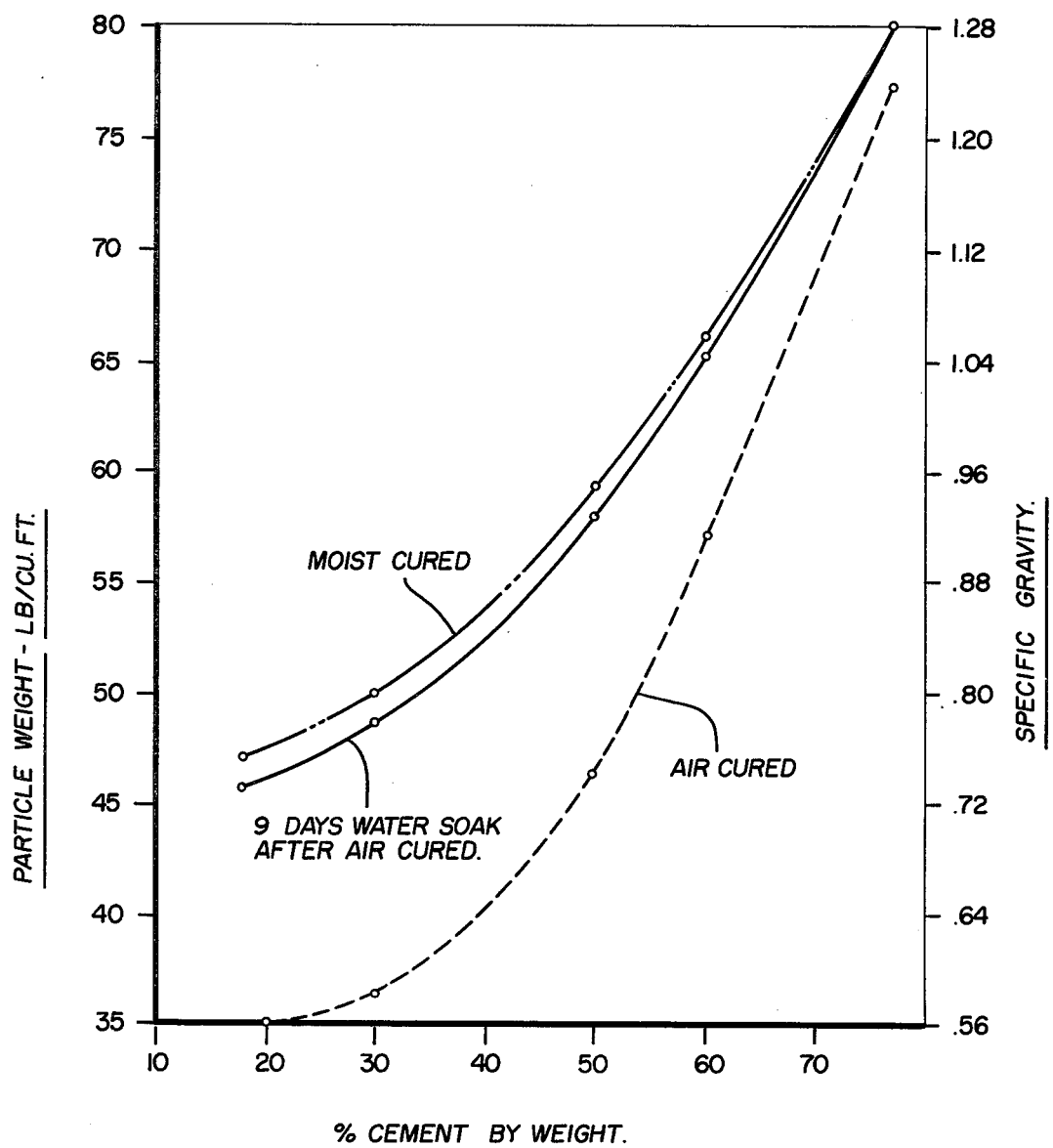

SYNTHETIC GRANULAR FILTER MATERIAL

RELATED APPLICATIONS

This application is a continuation-in-part of my earlier filed U.S. Application, Ser. No. 879,281, filed Feb. 21, 1978, now abandoned, and also is related to my co-pending application, filed on even date herewith, Ser. No. 023,470, claiming a filter and method of filtration utilizing the granular filter material of this invention, and other similar materials.

BACKGROUND OF THE INVENTION

Standard deep bed filters consist of carefully graded layers of granular filter media. Typically, such a filter bed may consist of one or more layers of anthracite superimposed upon lower layers of sand. Several attempts have been made to provide an uppermost layer of a larger, more porous lightweight material which can act as a buffer or strainer for removing larger particles, flocculents, or high concentrations of contaminants which have a tendency to surface load and plug the upper exposed surfaces of standard deep bed filters. Such particles for the upper surface should have the characteristics of, (1) water-wettability, (2) relatively large, uniform size, (3) relatively low, controlled density, and (4) liquid impermability to avoid density change during use.

The provision of such materials would avoid surface clogging or blinding of the filter bed, minimize intermingling of the layers of the filter bed after backwashing, and prevent either the adherence of air bubbles to the particles or the absorption of liquid by the particles which changes the density of the particles.

BRIEF DESCRIPTION OF THE INVENTION

The present invention now provides synthetic granular filter particles meeting the requirements set forth above. Generally, the particles comprise silica beads dispersed in a matrix of cured cement. The silica beads may be glass micro-spheres, or those hollow spherical particles which are generated in coalfired boiler plants and removed by electrostatic precipitators. These hollow particles from the precipitators float in the precipitator wash water and can be collected and removed for use in the present invention.

The spheres and the cement are mixed in proportions to yield a final molded particle which has a specific gravity ranging from about 1.04 to about 1.5. It has been found that such specific gravities can be obtained only by the utilization of an amount of cement substantially greater than the calculated volume of the cement which normally would, in combination with the spherical silica material, yield the final particle density. In other words, it was expected that a mixture of approximately ten parts cement having a specific gravity of 3.15 with six parts of water having a specific gravity of 1.0 and fifty parts of silica beads having a specific gravity of 0.8 would yield a particle having a specific gravitiy of about 1.0. However, it was found upon experimentation that the actual specific gravity was below 0.6. Unexpectedly, from 60 to 85% cement and from 15 to 40% silica beads are required to yield synthetic particles having a specific gravity of 1.0 or greater. The reason, apparently, is that each silica bead is surrounded by tightly adherent layers of water, and that this water chemically reacts with the cement during curing to leave closed cells around most of each silica bead. This surprising and unexpected result has several interesting product effects. Since most cells are closed, there is substantially no increase in the weight of the particles after extended periods of soaking in water. Further, the particles are structurally strong, having compressive strengths on the order of 2,000 to 2,500 pounds per square inch. Additionally, the final particles are completely water-wettable.

The method of making the synthetic filter material includes the steps of mixing cement and the hollow, essentially spherical silica particles in proportions to yield a final cured granule having a specific gravity ranging from about 1.04 to about 1.5, adding water to the mixture to form the mixture into a slurry, placing the slurry in a mold, curing the slurry in the mold and then removing the molded granules. If the granules are cured in an atmosphere of 100% humidity, the cured, final particles do not absorb water. If the particles are air-cured, the particles take on moisture for an extended period of time, on the order of nine days, after which the total amount of absorbed moisture substantially stabilizes and no significant amount of water is taken on.

The particles can be molded to any desired shape or form. A presently preferred form is essentially cylindrical and has substantially the same diameter and length. For ease of removal from the mold, the particles may be tapered in the form of truncated cones, but the overall shape is essentially cylindrical. While the particles are all essentially uniform in size and shape, the sizes and/or shapes are varied slightly, in a preferred form of the invention, to prevent clustering of the particles during backwash and to reduce the tendency of the particles to cling to one another. As used herein, the term "of substantially the same size and shape" is intended to include such variations.

In use, the granules of the present invention can either be utilized as the top layers in a multi-layer filter having the lower layers composed of naturally-occurring materials, or the entire bed may be constituted of the granules of the present invention. In either event, the bed consists of particles which are of increasing density and decreasing size in the direction of liquid flow through the bed. Specific bed configurations and specific methods of filtration utilizing the granules of the present invention are set forth in my co-pending application which is identified above.

OBJECTS

It is, therefore, an important object of the present invention to provide an improved granule for utilization as a filter medium, the granule being synthetic, water-wettable, and of controlled density.

Another important object of the present invention is the provision of a method of making a synthetic filter medium particle or granule by forming the granule to size from a mixture of cement, water and silica beads which are blended in the proper proportions to yield the desired specific gravity of the granule.

It is another important object of this invention to provide a synthetic water-wettable filter medium granule of substantially uniform size ranging from 1/16 inch to about ⅜ inch in each dimension and having a specific gravity ranging from about 1.04 to about 1.5.

ON THE DRAWING

The single FIGURE is a chart of specific gravity of granules of the present invention plotted against percent cement by weight in the granules.

DETAILED DESCRIPTION OF THE PREFERRED EMBODIMENT

As above explained, the preferred embodiment of the present invention is a synthetic, water-wettable granule or particle which, preferably, is essentially cylindrical, which has a length ranging from about 1/16 of an inch to about ⅜ of an inch, which has a diameter ranging from about 1/16 of an inch to about ⅜ of an inch, and which has a specific gravity ranging from about 1.04 to about 1.5, the granule comprising hollow, sperical silica beads dispersed in a matrix of cured cement.

The cement which is utilized is "normal portland cement" although other classes of cement, such as higher-earlier-strength cement may be utilized, if desired. Cement is the preferred binder material, since it is very stable in aqueous environments, it is an inexpensive, readily available material, and it is water-wettable.

The hollow silica spheres may be either glass microballoons, which are hollow glass or sodium borosilicate beads having a size on the order of 44 to 175 microns and a specific gravity (dry) of about 0.32, or closed hollow spherical particles which are generated in coal-fired boiler plants and removed by electrostatic precipitators. These particles from the precipitators are generally discharged into a hopper at the bottom of the precipitator and are then washed with water into a lagoon. By far, the majority of the particles settle in the lagoon. However, a small percentage of these particles float on top of the lagoon, and these particles have a specific gravity of less than one, and are essentially silica. These particles again are of a size on the order of about 70 microns or slightly larger, preferably on the order of 0.002 to 0.008 inches in diameter. Each such particle, whether a glass micro-balloon or the silica particle from the precipitator, apparently has a tightly adherent surface layer of water which substantially completely surrounds the particles.

In preparing the synthetic particle of the present invention, the cement is mixed with the amount of water necessary for curing, and with the glass beads in the necessary proportions to yield a final specific gravity from about 1.04 to about 1.4. This specific gravity is chosen so that the granules will be lighter than the naturally occurring other filter media which may be used in conjunction therewith and yet heavier than water, so that the granules will stay in place during filtration operation and will return to their initial position after backwashing to clean the filter. Also, it is possible to mold granules of graded density, so that granules of greater density can form the lower strata of a filter bed, and the lower strate will accurately reform after backwash. Where the particle is utilized to filter non-aqueous mixtures, the minimum specific gravity is more than 0.04 greater than the liquid, so that the particle will not float. Where the particle is utilized in conjunction with other filter materials in a stratified bed, the specific gravity of the particle is at least 0.04 more than the specific gravity of the next adjacent material of the bed.

To obtain the desired final densities, for example on the order of 1.1, it normally would be expected that a mixture of about ten parts cement, six parts water and fifty parts silica beads would be required. However, it was discovered that such a mixture results in a final molded granule having a specific gravity below 0.6. It has been found, by actual experimentation, that substantially greater amounts of cement and substantially lesser amounts of silica beads were required. From the attached chart of FIG. 1, it will be seen that at least 60% cement and 40% beads are required to yield synthetic composite particles having specific gravities on the order of 1.04 and greater. Preferably, from 60 to 85% cement and from 15 to 40% beads are utilized.

As can best be determined at the present time, each silica bead, whether from the electrostatic precipitators or glass, is surrounded by strongly adherent film of water and this water reacts, during curing of the cement, with the cement to form closed air cells surrounding each bead. These cells substantially reduce the density of the final molded prouct, and explain the appreciable differential between the calculated absolute density of the granule and the lesser actual density.

As above explained, the cured cement is completely water-wettable, and the silica beads also are water-wettable. In the event that any portion of any silica bead is not encompassed within or encased within the cement or the closed cells surrounding each bead, there is no interference with the overall water-wettability of the granule, since the bead itself is water-wettable.

In the manufacture of the granules, the adherent water layer on the silica bead must be included in the calculations. For example, a granule having a specific gravity of approximately 1.15 can be manufactured from a dry mixture calculated to yield 66% cement and 34% silica beads, on a dry weight basis. The actual quantities involved were 300 grams of dry silica beads, 600 grams of cement, 291 grams of water with the silica, and 50 grams of added water.

To indicate the quantity of the air cells which are entrapped adjacent the beads, a granule formed from six parts cement having a specific gravity of 3.15, plus four parts hollow silica beads having a specific gravity of about 0.8, plus three parts of water would have a calculated solid, specific gravity of approximately 1.9. It has been found by experimentation that the specific gravity is approximately 1.0, indicating that there is over forty percent (40%) air cells in this granule which, in effect, reduce its specific gravity. Where these granules were cured at one hundred percent (100%) humidity, there was no substantial increase in the weight of the particles after extended soaking periods in excess of nine days.

At the same time, the particles or granules have remarkable structural integrity and structural strength. Testng has indicated that the granules have compressive strengths on the order of from about 2,000 to about 2,500 pounds per square inch, as compared to a compressive strength of about 3000–5000 pounds per square inch for structural concrete.

The evidence to date indicates that each silica bead or sphere, which is approximately 0.002 to 0.008 inches in diameter, has a surface skin of water surrounding the bead which is much thicker than the bead itself and which holds to the bead with great tenacity. This surface layer or boundary of water combines chemically with the cement during the curing period, leaving closed cells around a substantial portion of each particle.

The molding of the granlules is extremely simple, utilizing a mold plate of plastic, metal or even wood into which tapered holes are drilled of a diameter and depth corresponding to the diameter and length of the desired particles. The cement-bead-water mixture is troweled into each hole and is allowed to cure until it has a definite solid shape. The cured granule is then pushed out or shaken out of the hole in which it was molded. For ease of removal, the holes are tapered and ejection pins are utilized to push the particles or granules from the holes. To avoid clustering and sticking of the granules to one another, preferably, the granules are made in several different sizes which vary slightly from one another up to a maximum of about 20% yet are of the same density. This can be readily accomplished by varying the mold cavity sizes. Such particles are still of substantially uniform size and shape. Alternatively, the cement-bead mixture can be cast as a sheet which is then broken into individual particles which are sized by screening. Again, the screened particles will be of substantially uniform size. Preferably, the particles in each layer of a multi-layered filter bed are of substantially the same size and of precisely the same density. The granules preferably are essentially cylindrical in shape, with the slight taper utilized during the molding process resulting in a truncated cone which is still essentially cylindrical.

In a typical deep bed filter, the bottom layer would be sand, an intermediate layer would be anthracite and the top layer would be composed of granules of the present invention in the form of truncated cones havng a length of ¼ inch, having a large diameter of ¼ inch, having a small diameter of 3/16 inch and having a specific gravity of 1.15. Granules of the present invention of this shape would produce the maximum voids and porosity between particles and generally the porosity would be in the 60% plus catagory.

Where several layers of granules of the present invention are utilized, the granules of the successive layers would be of increasing density and decreasing size in the direction of liquid flow through the filter bed.

I claim:

1. A synthetic, water-wettable filter medium particle comprising a plurality of hollow silica beads distributed in a matrix of cured cement, the specific gravity of the particle ranging from about 1.04 to about 1.5.

2. A particle as defined in claim 1, wherein the particle is essentially cylindrical in shape and of substantially equal diameter and length.

3. A particle as defined in claim 2, wherein the particle is in the form of a truncated cone.

4. A synthetic filter medium granule in the form of a molded shape consisting essentially of a matrix of cured cement and a plurality of hollow, essentially spherical silica beads distributed in the matrix, each of said beads being substantially surrounded by cells encased in the cement matrix and reducing the specific gravity of the granule to a value ranging from about 1.04 to about 1.5.

5. A molded synthetic filter medium granule consisting essentially of from about 60% to about 85% by weight cured cement and from about 15% to about 40% by weight silica beads, said granule having a specific gravity ranging from about 1.04 to about 1.5 and having a water-wettable exterior surface.

* * * * *